No. 664,571. Patented Dec. 25, 1900.
O. MORRILL & H. P. WELLS.
ELLIPTIC SPRING.
(Application filed Aug. 9, 1900.)

(No Model.)

Witnesses:
D. W. Edelin
E. C. Duffy

Inventors:
Osgood Morrill and
Harlan P. Wells.
By J. E. Stebbins, Atty.

UNITED STATES PATENT OFFICE.

OSGOOD MORRILL AND HARLAN P. WELLS, OF AMESBURY, MASSACHUSETTS.

ELLIPTIC SPRING.

SPECIFICATION forming part of Letters Patent No. 664,571, dated December 25, 1900.

Application filed August 9, 1900. Serial No. 26,437. (No model.)

*To all whom it may concern:*

Be it known that we, OSGOOD MORRILL, a citizen of the United States, and HARLAN P. WELLS, a subject of the Queen of Great Britain and Ireland, both residing at Amesbury, in the county of Essex and State of Massachusetts, have invented certain new and useful Improvements in Elliptic Springs, of which the following is a specification.

Our invention relates to elliptic springs, and in particular to the master-leaves and the socket-pieces which unite the leaves, our objects being, first, the provision of means for preventing the rattling of the loose ends of a leaf or leaves, and, second, the provision of antifriction-bearings for the ends of the movable leaf or leaves, and which antifriction-bearings shall serve when so desired to hold the movable leaf or leaves within the socket-pieces and obviate the possibility of their accidental displacement.

Our invention consists objectively in an elliptic spring having the ends of the master-leaves united by socket-pieces, and supplemental springs engaging the ends of one of the master-leaves and the socket-pieces.

It further consists in a spring having the ends of a master leaf or leaves engaging balls, so as to facilitate the movement of the said ends of the leaf or leaves and constitute antifriction-bearings.

Finally, it consists in certain novelties of construction and combinations of parts hereinafter set forth, and specified in the claims.

The accompanying drawings illustrate two examples of the physical embodiment of our invention constructed according to the best of the several modes we have so far advised for the practical application of the principle.

Figure 1:
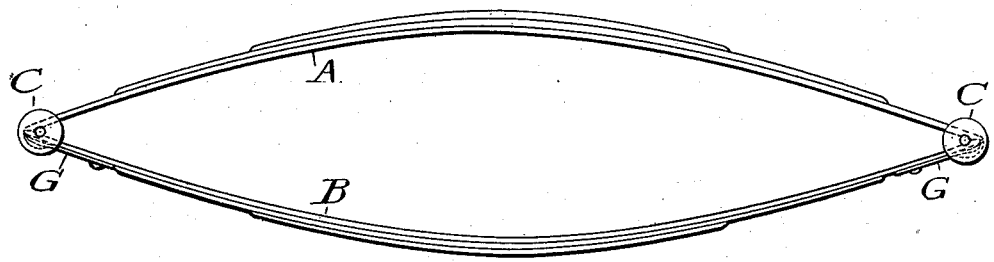
Figure 2:
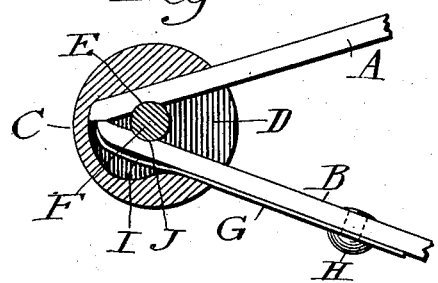
Figure 3:
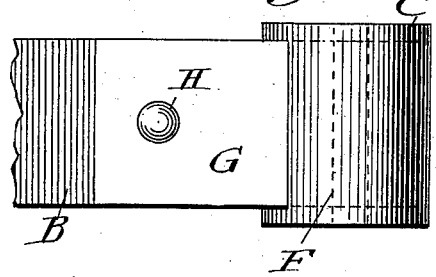
Figure 4:
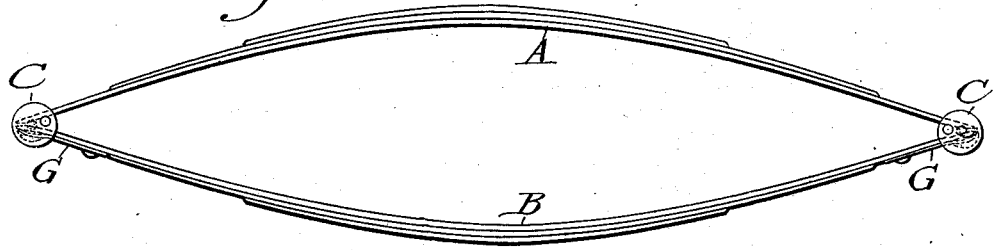
Figure 5:
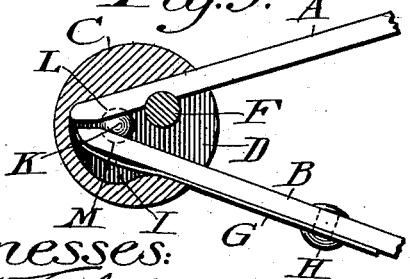
Figure 6:
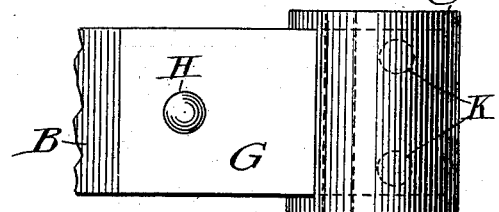

Figure 1 is a view in side elevation of an elliptic spring with our improvements. Fig. 2 is a side elevation view of one end of the spring, enlarged, and with the end of the socket-piece removed. Fig. 3 is a bottom plan view of one end of the spring, also enlarged. Fig. 4 illustrates a second example of our improved spring. Fig. 5 is a side elevation view of one end of the spring shown in Fig. 4, enlarged, and with one end of the socket-piece removed. Fig. 6 is a bottom plan view of one end of the spring shown in Fig. 4, enlarged.

Referring to the several figures, which illustrate both examples, the letter A designates the top master-leaves of the springs; B, the bottom master-leaves; C, the socket-pieces; D, the recesses made in the sides of the socket-pieces; E, seats for bolts, made adjacent the ends of the upper master-leaves; F, bolts which pass through holes made in the socket-pieces and frictionally engage the seats E at the ends of the upper master-leaves; G, supplemental springs, each in this instance made in the shape of a leaf having one end within a recess D in a socket-piece and the other end lying in contact with the surface of a master-leaf and outside the socket-piece; H, rivets which hold the supplemental springs in place, and I are the curved or bent ends of the supplemental springs, located within the recesses of the socket-pieces.

Referring to Figs. 1, 2, and 3, the letter J designates seats made near the ends of the lower master-leaf, within which are located the same bolts F F which engage the seats near the ends of the upper master-leaf.

Referring to the second example, (shown in Figs. 4, 5, and 6,) the letter K designates metallic balls or cylinders, L seats for the balls near the ends of the upper master-leaf, and M seats for the balls near the ends of the lower master-leaf.

The methods of assembling the several constituent parts and elements of each spring are obvious from the drawings and need not be specifically set forth.

It will be observed that in the first example the ends of each master-leaf are provided with seats for the retaining-bolts, that the bolts hold the socket-pieces immovable relative to one (the upper) master-leaf, that the recesses in the bodies of the socket-pieces are large enough to allow movement of the ends of the lower master-leaf, and that the supplemental springs hold the ends of the lower master-leaf against the bolts very firmly, so that they cannot vibrate sufficiently to strike the ends or walls of the socket-pieces and rattle.

In the second example the socket-pieces are held immovable relative to the upper master-leaf by the bolts the same as in the first example, also the supplemental springs serve the same purpose and perform the same functions as the like springs in the first example, although the supplemental springs here hold the ends of the lower master-leaf against the balls instead of against the bolts.

The second example differs from the first mainly in having the antifriction balls or cylinders interposed between the adjacent ends of the master-leaves at each end of the spring.

On reference to Fig. 5 it will be seen that the ends of the two master-leaves adjacent the balls are located a slight distance apart and that the recess in the socket-piece is enlarged sufficiently to give free play for the end of the lower master-leaf.

While we have illustrated and described only two complete examples of the physical embodiment of our invention, we do not thereby intend to restrict the scope of the same to such specific examples, inasmuch as our improvements may be applied by other modes in other forms. There may be employed in lieu of the supplemental spring shown any other suitable type and differently located, if desired, to perform the functions of holding the ends of a master-leaf against rattling. Any number of balls or antifriction-bodies, such as cylinders or rolls, may be placed between the ends of adjacent master-leaves. The balls or other movable bodies may be located between the end of a movable master-leaf and the body of a socket-piece. Both the adjacent ends of two master-leaves may in some examples be movable upon the antifriction balls or elements within a socket-piece. A modified form or shape of socket-piece may be used in connection with the supplemental spring or the balls and the adjacent ends of the master-leaves, and the shape of the ends of the master-leaves may be changed or the ends of one of them changed so as to be curved instead of straight, as shown in the drawings. These and analogous alterations may be introduced at the will of the manufacturer without constituting a substantial departure.

What we claim is—

1. The combination in a spring of master-leaves; socket-pieces having recesses within which the ends of the master-leaves are located; and supplemental metallic springs to prevent rattling.

2. The combination in a spring of master-leaves; socket-pieces; and supplemental metallic leaf-springs to prevent rattling.

3. The combination in a spring of master-leaves having straight ends; socket-pieces having recesses within which the ends of the master-leaves are located; and supplemental springs having bent ends.

4. The combination in a spring of master-leaves; socket-pieces; and supplemental springs bearing against a socket-piece and a spring and holding the latter against excessive vibration and rattling.

5. The combination in a spring of master-leaves; socket-pieces rigidly secured to the ends of one master-leaf and loosely engaging and retaining the ends of the other master-leaf; and supplemental springs in connection with the leaf having loose and movable ends.

6. The combination in an elliptic spring, of master-leaves; socket-pieces having recesses, each socket-piece rigidly secured to the end of one of the master-leaves; and movable antifriction elements interposed between the ends of the master-leaves and which prevent the displacement of the loose master-leaf from the recesses in the sockets.

7. The combination in an elliptic spring, of master-leaves; socket-pieces having recesses; bolts holding the ends of one master-leaf rigidly in the sockets; and movable antifriction elements which retain the ends of the other and movable master-leaf within the recesses of the socket-pieces.

8. The combination in an elliptic spring, of master-leaves having straight unbent ends; socket-pieces having recesses in the sides thereof; bolts holding the ends of one of the master-leaves rigidly in the recesses of the socket-pieces; the other master-leaf having seats for balls, and balls interposed between the ends of the master-leaves and holding the loose master-leaf against displacement.

9. The combination in an elliptic spring of master-leaves; socket-pieces; means for rigidly holding the ends of one master-leaf within the socket-pieces; and balls between the ends of the immovable master-leaf and the movable master-leaf for holding the latter leaf within the socket-pieces.

10. The combination in a spring of master-leaves; socket-pieces rigidly secured to the ends of one of the master-leaves and loosely retaining the ends of the other master-leaf; seats M and L in the ends of the master-leaves; and movable antifriction elements in the seats.

11. The combination in a spring of master-leaves; socket-pieces; antifriction-bearings; and supplemental springs engaging the socket-pieces.

12. The combination in a spring of master-leaves; socket-pieces; antifriction-bearings; and leaf supplemental springs, each engaging a socket-piece.

13. An elliptic spring having ball-bearings, and supplemental springs engaging the ends of a master-leaf and socket-pieces to prevent rattling.

In testimony whereof we affix our signatures in presence of two witnesses.

OSGOOD MORRILL.
HARLAN P. WELLS.

Witnesses:
GEORGE H. BRIGGS,
GEO. L. BRIGGS.